United States Patent [19]

Bernstein

[11] Patent Number: 5,188,229
[45] Date of Patent: Feb. 23, 1993

[54] COMPACT DISC PACKAGE

[75] Inventor: Linda A. Bernstein, Campbell Hall, N.Y.

[73] Assignee: International Paper Company, Purchase, N.Y.

[21] Appl. No.: 680,962

[22] Filed: Apr. 5, 1991

[51] Int. Cl.$^5$ .............................................. B65D 85/57
[52] U.S. Cl. ................................... 206/312; 206/309; 206/310; 206/492
[58] Field of Search ............... 206/307, 309, 310, 311, 206/312, 444, 492; 229/235, 236

[56] References Cited

U.S. PATENT DOCUMENTS

| | | | |
|---|---|---|---|
| 2,189,076 | 2/1940 | Liskin | 206/309 |
| 3,109,539 | 11/1963 | Turoff . | |
| 3,375,968 | 4/1968 | Weiss | 206/492 |
| 3,595,383 | 7/1971 | Boylan | 206/312 |
| 3,717,297 | 2/1973 | Perry | 206/312 |
| 4,314,635 | 2/1982 | Fraser et al. . | |
| 4,620,630 | 11/1986 | Moss . | |
| 4,694,954 | 9/1987 | Moss . | |
| 4,709,812 | 12/1987 | Kosterka | 206/310 |
| 4,850,731 | 7/1989 | Youngs . | |

FOREIGN PATENT DOCUMENTS

| | | | |
|---|---|---|---|
| 335826 | 10/1989 | European Pat. Off. | 206/309 |
| 3425576 | 1/1986 | Fed. Rep. of Germany | 206/307 |
| 139379 | 5/1990 | Japan | 206/307 |
| 2219573 | 12/1989 | United Kingdom | 206/309 |

*Primary Examiner*—David T. Fidei
*Attorney, Agent, or Firm*—Michael J. Doyle; Walt Thomas Zielinski

[57] ABSTRACT

A compact disc (CD) package formed from a unitary paperboard blank. The package is relatively long and stiff in its pre-purchased form and is readily foldable widthwise only after purchase. To permit folding after purchase, any outer wrapping is removed and the purchaser pulls a tear strip to rip away two of three layers of paperboard spanning the width of the package. This removal permits relatively easy folding of the remaining paperboard layer. The package yields both the desired pre-purchase larger size to permit desired graphics and also inhibits shoplifting. The lesser size of the package after folding facilitates storage by the purchaser. The blank of FIG. 1 includes a first pair of panels (20, 22) in a first row, a second pair of panels (30, 28) in a second row, and a third pair of panels (14, 12) in a third row. The panels of the first pair are joined by a foldable joint (46). The panels of the second pair are joined by a first frangible connection in the form of a tear strip (40). The panels of the third pair are connected by a frangible connection in the form of a tear strip (35). A panel (28) in the second row has a cut-out (52) for receiving a compact disc. A panel (22) in the first pair is provided with a plastic hub or pintle (51) which extends through the usual central hole in a compact disc (83). The three rows of panels are sequentially folded and secured together to form a three layer laminate. Upper and lower lateral panels (16, 26 and 18, 24) are added to provide protection for the CD during distribution as well as additional space for graphics.

20 Claims, 6 Drawing Sheets

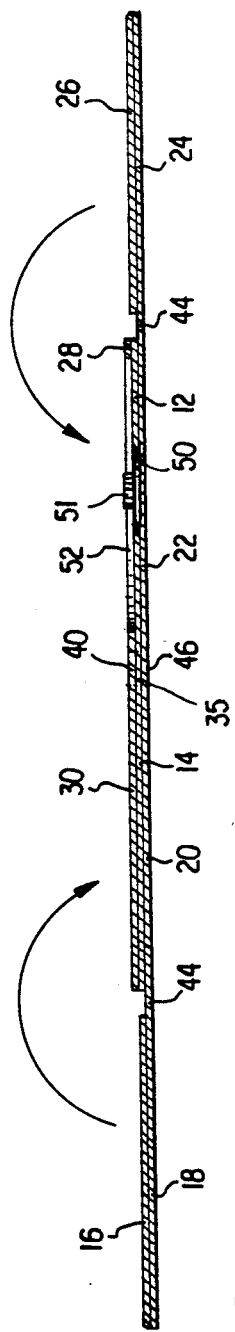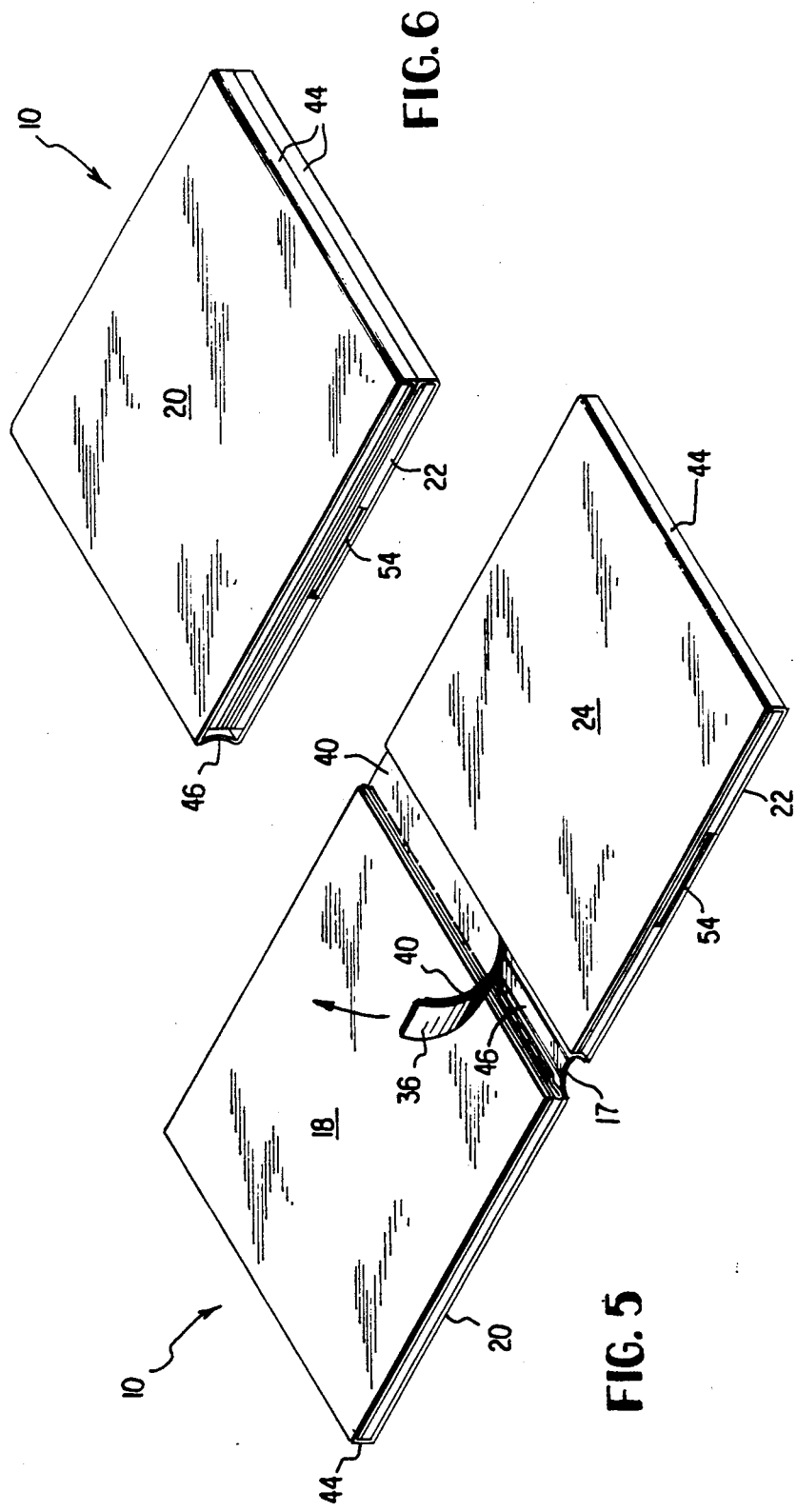

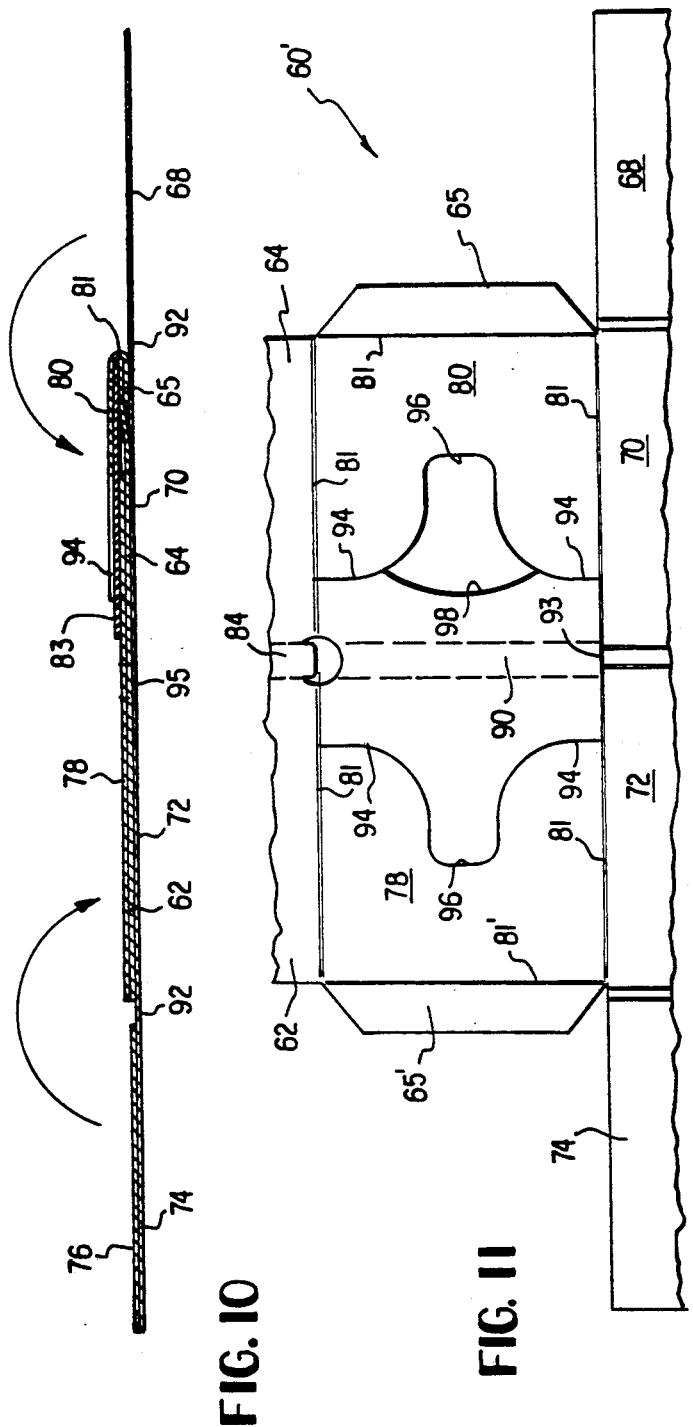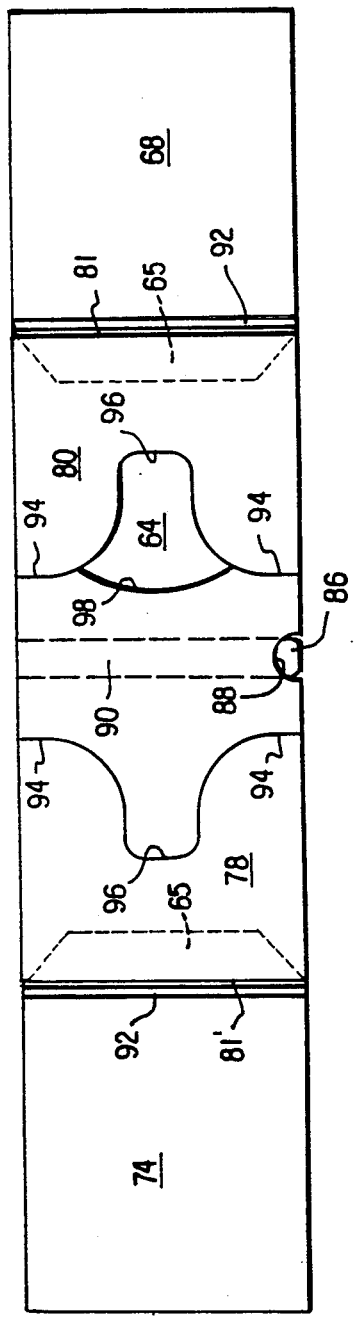
FIG. 10
FIG. 11
FIG. 12

COMPACT DISC PACKAGE

BACKGROUND OF THE INVENTION

This invention relates to a package, and more particularly to a package for a compact disc (CD), a sound recording element formed typically of polycarbonate.

The packaging art is aware of constructions for compact discs. Currently, the worldwide standard CD package is a three-piece molded plastic box termed a jewel box. The jewel box is of thin parallelepiped shape having two trays hinged together, and a molded plastic insert for one of the trays, the insert having a shallow recess for receiving a CD. Graphics and information are printed on separate paper inserts which are enclosed within the jewel box. The jewel box fits into home storage units or containers. In the United States, the jewel box is enclosed in a paperboard longbox for distribution in retail display. The purpose of the additional longbox packaging is three-fold. The first is theft prevention, the second is sales promotion, and the third is compatibility with present retail display fixtures. The longbox is discarded by the consumer after purchase.

SUMMARY OF THE INVENTION

The package of the present invention reduces the number of packaging components necessary while still satisfying all consumer retail and distribution cycle requirements provided by current jewel box/longbox combinations. Throwaway components are virtually eliminated.

According to the practice of this invention, a package for a compact disc is formed from a unitary blank of paperboard or other stiff, foldable and resilient sheet material, which is suitably cut, as by die cutting, so as to form a plurality of generally rectangular panels connected to each other in rows. Two panels of two of the rows are joined to each other by a frangible connection, to thus define two frangible connections, each preferably in the form of a tear strip, the tear strips overlying a non-frangible fold (foldable joint) which connects yet another, third, pair of panels in a third row. The blank is provided with graphics and after folding and sealing several of the panels together, a compact disc is placed in a pocket defined by cutout portions of one or more of the individual panels. A separate booklet can be adhered to a panel opposite to the panel which receives the compact disc, and the resulting structure is wrapped. After purchase of the package by a consumer, the consumer removes the wrapping, pulls one of the tear strips to thereby remove it as well as the other tear strip. This tear strip removal permits a relatively easy folding of the package since two of three paperboard layers are removed upon pulling the tear strips. The size of the package is reduced by about one-half upon folding by the purchaser, and conforms to standard home storage units previously designed for the jewel box.

In one embodiment of the invention, the space for the compact disc is defined by a circular opening in one or more layers of the paperboard, the CD maintained firmly therein by a conventional plastic hub or pintle mounted on one of the panels. In another embodiment, the space for the disc assumes the form of a pocket including a curved slit in one of the panels into which the compact disc is inserted.

The prior art is aware of a compact disc package partially fashioned from folded paperboard panels, as shown in U.S. Pat. No. 4,709,812 issued to Kosterka. Kosterka requires, however, a separate plastic CD holder 41 which is glued to one of the paperboard panels. FIG. 8 of Kosterka, at the lower right-hand portion thereof, illustrates a longbox into which his CD paperboard and plastic holder package is placed. It is seen that when the purchaser removes the package from the longbox, the longbox is discarded.

It has been proposed by others in this art to omit the longbox at the right-hand portion of FIG. 8 of Kosterka by stiffening the package shown at the third from the left of FIG. 8 along its longitudinal edges by rigid plastic tracks, and then wrapping that ensemble. This proposal omits the requirement of a longbox, but introduces the requirement for non-paperboard stiffening elements, again contributing to waste disposal and throw-away problems when the package is unwrapped to gain access to the disc.

BRIEF DESCRIPTION OF THE DRAWINGS

FIG. 4 is a view taken along section 4—4 of FIG. 3 and also illustrates inward folding of the end panels.

FIG. 5 illustrates the package of this invention as the purchaser commences ripping of certain tear strips.

FIG. 6 is a perspective view of the package of FIG. 5 after the tear strips have been completely ripped off and the left hand panels folded over so as to lie upon the right hand panels of FIG. 5.

FIG. 10 is a view along section 10—10 of FIG. 9.

FIG. 11 is a view illustrating a partial view of a third embodiment of the blank.

FIG. 12 is a view similar to FIG. 11 and shows the blank of FIG. 11 after the top and second rows of panels have been folded over so as to overlie the panels of the third row.

DETAILED DESCRIPTION OF THE INVENTION

Figure 1:
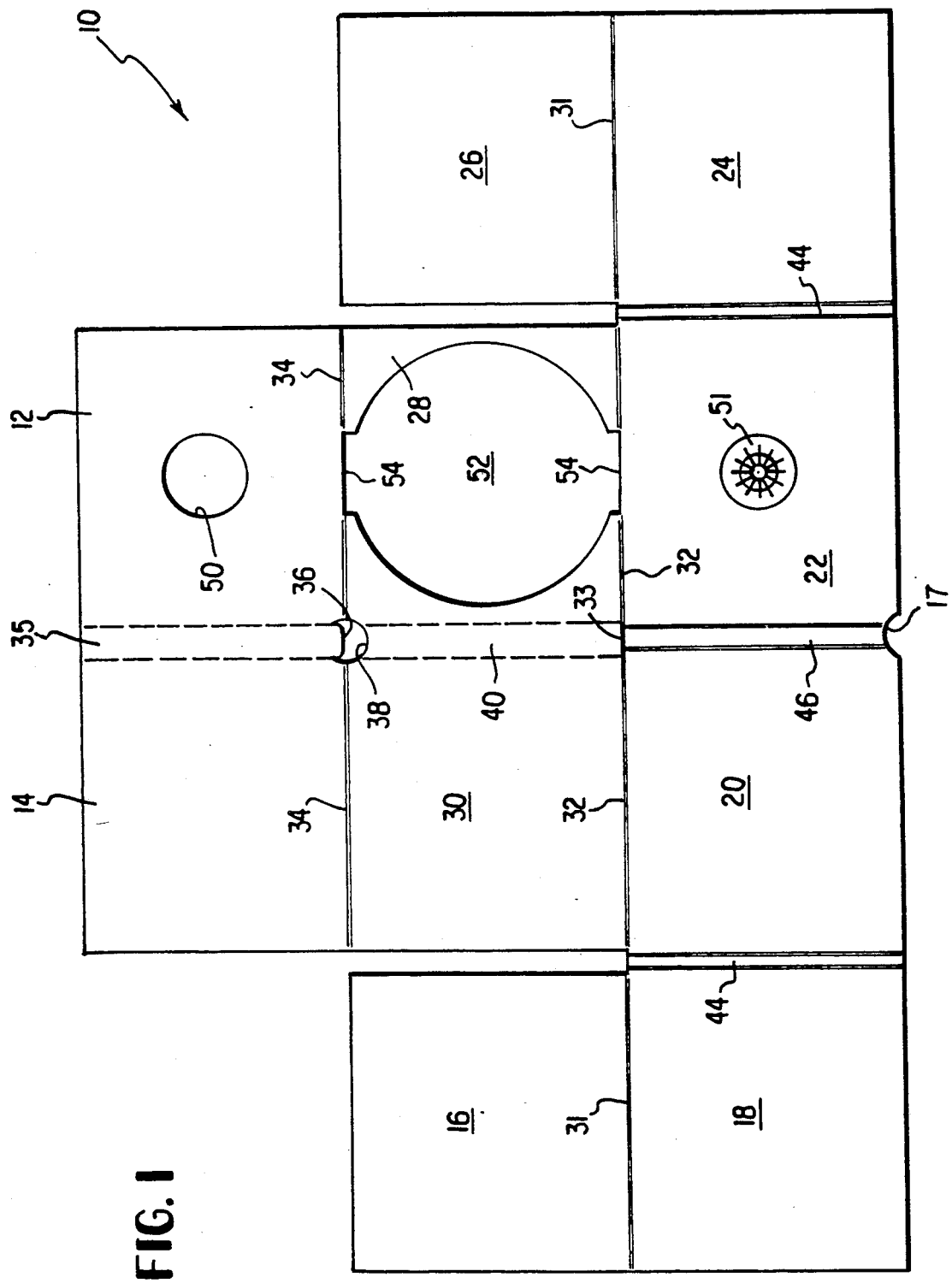
FIG. 1 is a plan view of a paperboard blank having a plurality of generally rectangular panels arranged in (horizontal) rows for forming the package of this invention according to a first embodiment.

Referring now to Figure of the drawings, a unitary paperboard blank from which the package of this invention is formed is denoted generally as 10. The blank includes a plurality of generally rectangular panels of which some are joined along both hinge or fold lines, and some of which are joined by frangible connections in the form of tear strips. The panels are respectively denoted as 12, 14, 16, 18, 20, 22, 24, 26, 28, 30. Fold lines 31, 32, and 34 join several pairs of the panels. The blank includes three horizontal rows of panels, with panel 14 located in the top row, panel 16 located in the middle row and panel 18 located in the lower row. A first tear strip (frangible connection) 35 joins two vertically extending edges of panels 12 and 14, this tear strip terminating in a lower free end or tip 36. A crescent shaped cutout 38 in the blank receives tip 36, with cutout 38 located at neighboring corners of panels 12, 14, 28 and 30. A second tear strip (frangible connection) is denoted as 40, located between and joining two vertical edges of panels 28 and 30. The upper end of the second tear strip terminates in cutout 38, with its lower end terminating at cut 33, the latter collinear with folds 32 and of the same width as tear strip 40. Spaced, double fold lines 44 join panel pairs 22, 24 and 18, 20. Somewhat wider apart double fold lines 46 join panels 20 and 22 and form a joint. It will be observed that upper lateral panels 16 and 26 are joined to respective lower lateral panels 18 and 24 by only one fold line 31, with the other three edges of panels 16 and 26 being free. Arcuate cut 17 is located at the lower end of fold lines 46 to permit easier grasping of end 36 of tear strip 35, as will later be seen.

Panel 12 is provided with a center cutout 50, generally circular in form. Next lower panel 28 is provided with a larger recess 52, circular in form except at upper and lower diametrically opposite cutout portions 54 thereof. The major peripheral portions of recess 52 are adapted to receive the periphery of a compact disc. A conventional plastic hub or pintle 51 is glued or otherwise sealed, for example, ultrasonically, to panel 22. The pintle resiliently engages the usual small opening in the center of a compact disc, as in conventional jewel box compact disc cases. Furthermore, the hub or pintle may also be mechanically engaged in one or more of the die-cut openings in panels 12 or 28. Die-cuts 50 and 52 may be provided on panels 14 and 30 as well as on 12 and 28. Further, die-cuts 50 and 52 could be omitted depending on the height required or desired in the pintle.

For convenience in description, lower panel pairs 20 and 22 are said to define a first row, middle panel pairs 28 and 30 define a second row, and lower panel pairs 12 and 14 define a third row. Thus panel 24 is in the first row and panel 26 is in the second row.

Figure 2:
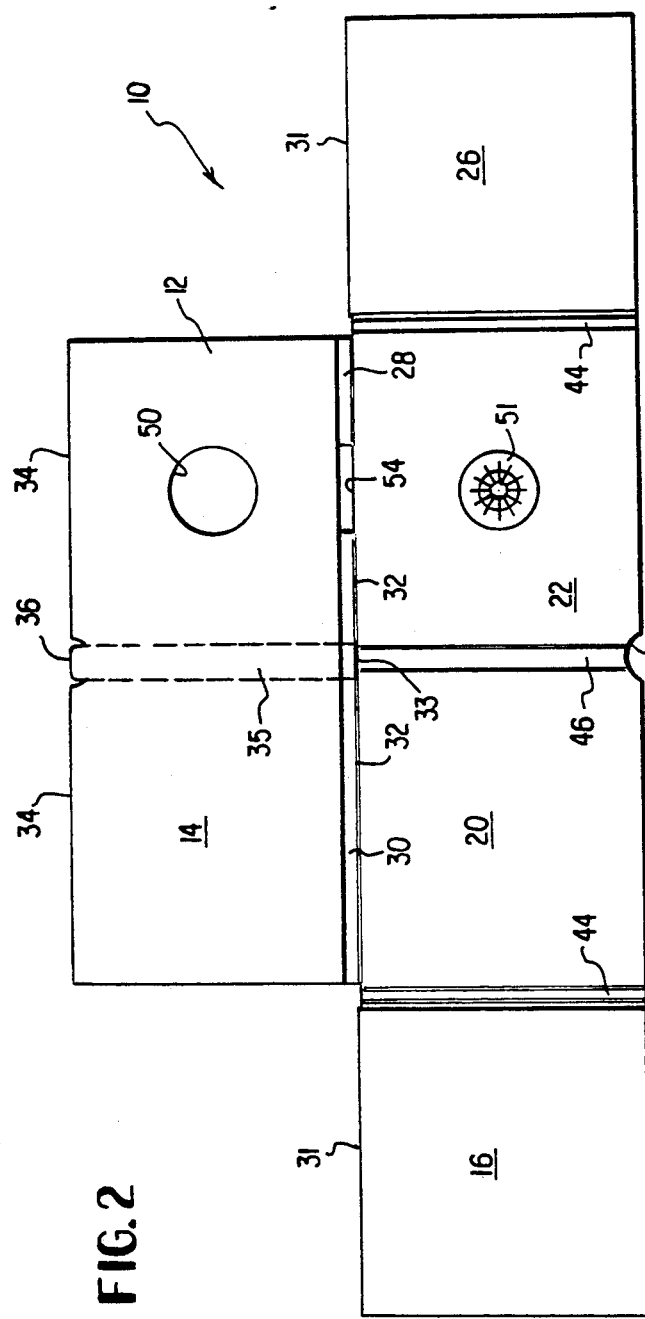
FIG. 2 is a view similar to FIG. 1, with the top row of panels folded down upon the middle row of panels.
Figure 3:
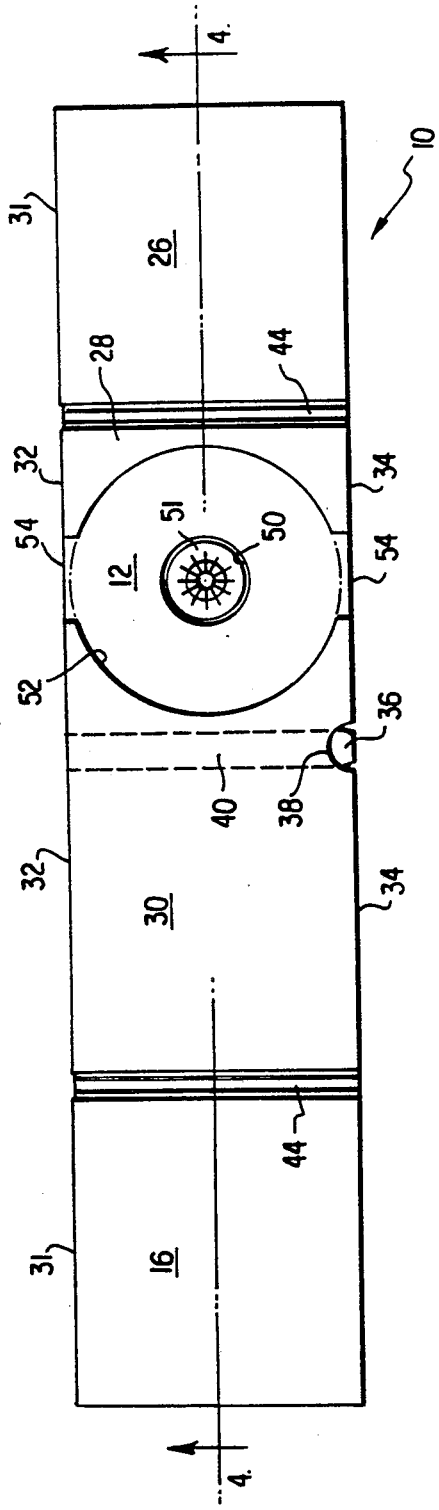
FIG. 3 is a view similar to FIG. 2, with the top and second rows folded over the third (lower) row.

Referring now also to FIGS. 2-6 of the drawings, one method of forming the package is illustrated. At FIG. 1, panels 12 and 14 are folded about horizontal fold lines 34 so as to lie on top of panels 28 and 30, with panel pairs 14, 30 and 12, 28 secured together by adhesive or by any desired technique. For example, if the paperboard is coated with a thin polyethylene layer, as is common in paperboard milk and juice cartons, the several panels may be ultrasonically or heat sealed together. Upper lateral panel 16 is also folded about its fold line 31 so as to lie against lower lateral panel 18 and is secured thereto. Similarly, upper lateral panel 26 is folded about its fold line 31 so as to lie against lower lateral panel 24, and is secured thereto. These operations yield the configuration of FIG. 2. The top row of double thickness panels of FIG. 2 is now folded along fold lines 32 so as to lie on top of panels 20 and 22 and is adhered thereto. The center two panels of FIG. 3 define a three layer laminate, with the top layer consisting of panels 28 and 30, the next layer consisting of panels 12 and 14, and the last or bottom layer consisting of panels 22 and 20. The outer two members shown as 16 and 26 of FIG. 3 are each of two layers. The two curved interrupted lines at FIG. 3 adjacent cutouts 54 show the location of a compact disc.

It is seen that with the alignment of tear strips 35 and 40 with double fold joint 46, and by virtue of the manner of folding, tear strip 35 is sandwiched between joint 46 and tear strip 40. A compact disc is placed in circular opening 52 in the folded blank configuration of FIG. 3, with pintle 51 extending through the conventional central opening in the CD. Panel pairs 24, 26 and 16, 18 are now folded about double fold lines 44, see curved arrows of FIG. 4, so as to overlie the middle two panels, with panel pairs 16, 18 overlying the three panel layer laminate 14, 30, 20. Similarly, panel pairs 26, 24 overlie the three panel layer laminate 12, 28, 22. This is the final configuration of the container and disc which may now then be wrapped as by a conventional outermost transparent flexible wrapper for example to form the completed package.

After purchasing the container with the compact disc therein, the consumer typically takes the container home, peels off the outer wrapper, opens the container by unfolding panel pairs 26, 24 to gain access to the compact disc and unfolds panel pairs 16, 18 to view any graphics associated with their inside surfaces.

The consumer is able to reduce by one half the size of the package for storage purposes. This is done by grasping the free edge 36 of tear strip 35 and ripping upwardly, as shown at FIG. 5. This causes the destruction of the frangible joint defined by tear strip 35, and also causes the destruction of the frangible joint defined by tear strip 40, since tear strip 40 is removed upon upward ripping of tear strip 35 by virtue of cut 33. Tear strip 35 is approximately the same width as tear strip 40 to facilitate this action. The tear strips are now discarded and the container is now able to fold, for storage, about double fold line 46, as shown at FIG. 6.

It is seen that prior to ripping of the tear strips, the container resists folding about foldable joint 46 by virtue of the stiffening effect of the frangible connections defined by tear strips 35 and 40 in the three layer laminate. This may also be seen by reference to FIG. 4. After tear strip removal, there is only a single layer of paperboard, defined by foldable joint 46, and this offers little resistance to folding. The frangible connections are shown as conventional tear strips, however any other frangible connections may be employed.

It will further be seen that the third panel pair 12, 14 in the upper row may be omitted, still yielding a container having a foldable joint 46 whose folding is resisted by tear strip 40, the latter defining the first frangible connection. In such a construction, opening 52 may be omitted. Alternatively, the third panel pair 12, 14 may be placed along the bottom edges of first row panels 20, 22 while retaining a fold sequence which results in tear strips 35 and 40 positioned next to each other after folding to produce the final container configuration. End panels 16, 18 and 24, 26 may likewise be omitted, although yielding a thinner package with less space for graphics.

Figure 7:
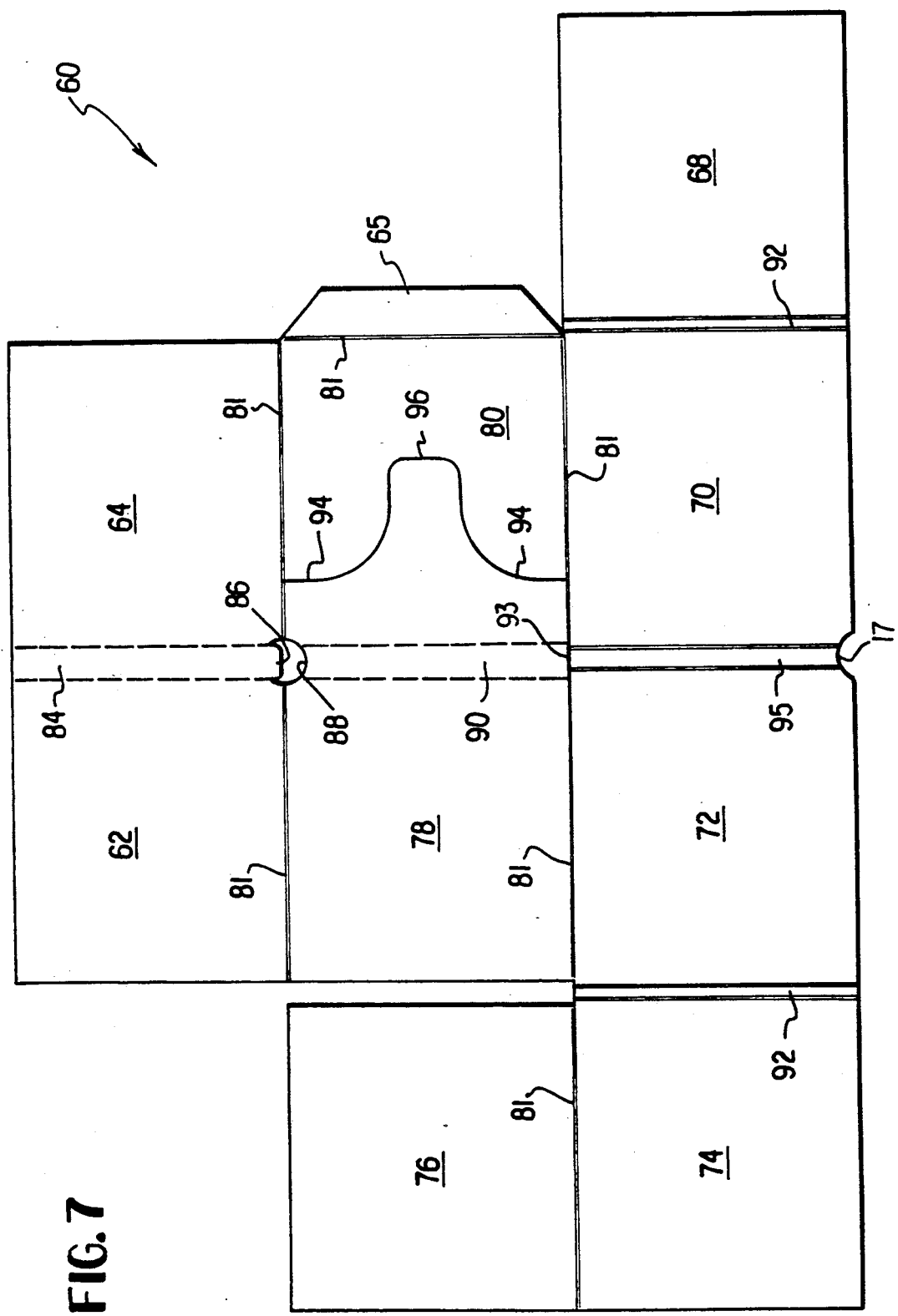
FIG. 7 is a plan view of a similar unitary paperboard blank for forming the package of this invention according to a second embodiment.

Referring now to FIG. 7 of the drawings, a second unitary blank fashioned from paperboard and which is adapted to form a second embodiment of the invention is denoted as 60. The general shape of the blank is the same as that of FIG. 1, and includes, similarly, a plurality of generally rectangular panels 62, 64, 68, 70, 72, 74, 76, 78 and 80. Fold lines 81, similar to fold lines 31 and 32 of the previous embodiment, join several of the panels. Panel 80 is provided on its right edge with foldable flap 65. An upper or first tear strip 84, defining a frangible connection, bridges and joins respective vertical edges of panels 62 and 64, with this tear strip terminating in free tip 86. A cutout or recess 88 receives tip 86, with recess 88 generally crescent shaped with portions thereof taken from corners of panels 62, 64, 80 and 78. A second (frangible connection) tear strip 90 has its upper end in communication with recess 88 and its lower end terminating at cut 93, the latter collinear with lower fold lines 81 and of the same width as tear strip 90. Double fold lines 92 join panel pairs 72, 74 and 70, 68. A somewhat wider double fold line 95 joins panel pairs 72, 70.

Figure 8:
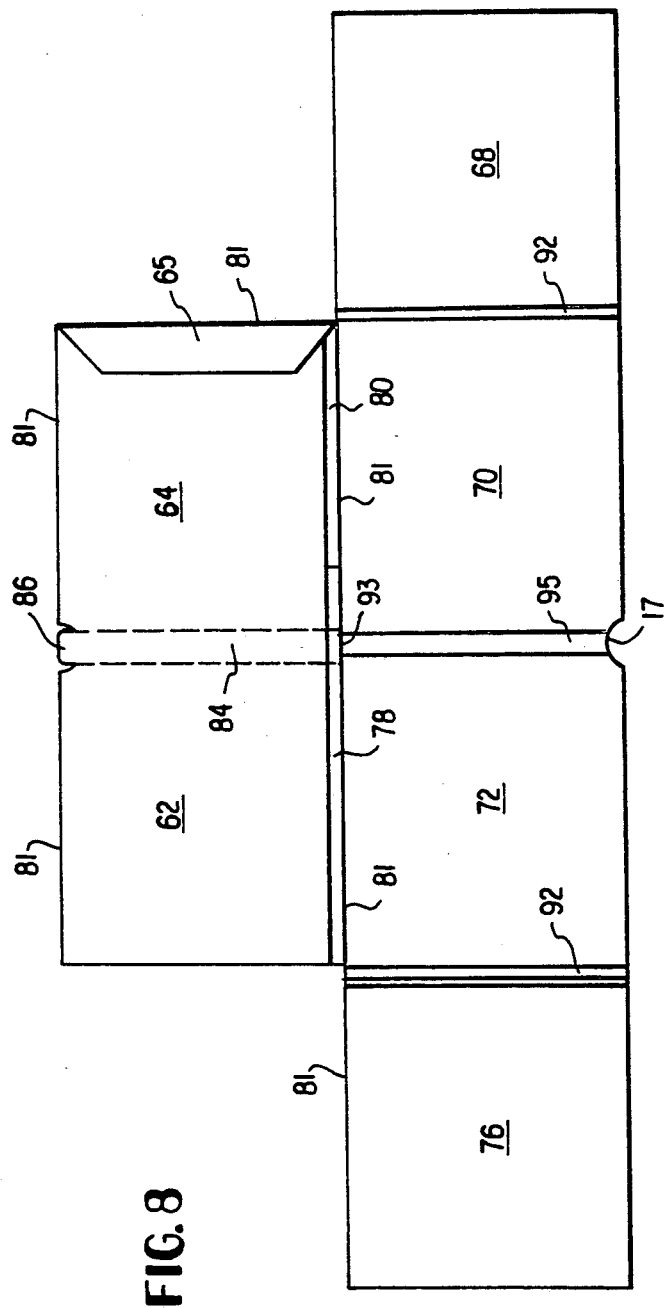
FIG. 8 is a view illustrating the blank of FIG. 7 after the top row of panels has been folded over the middle row of panels.
Figure 9:
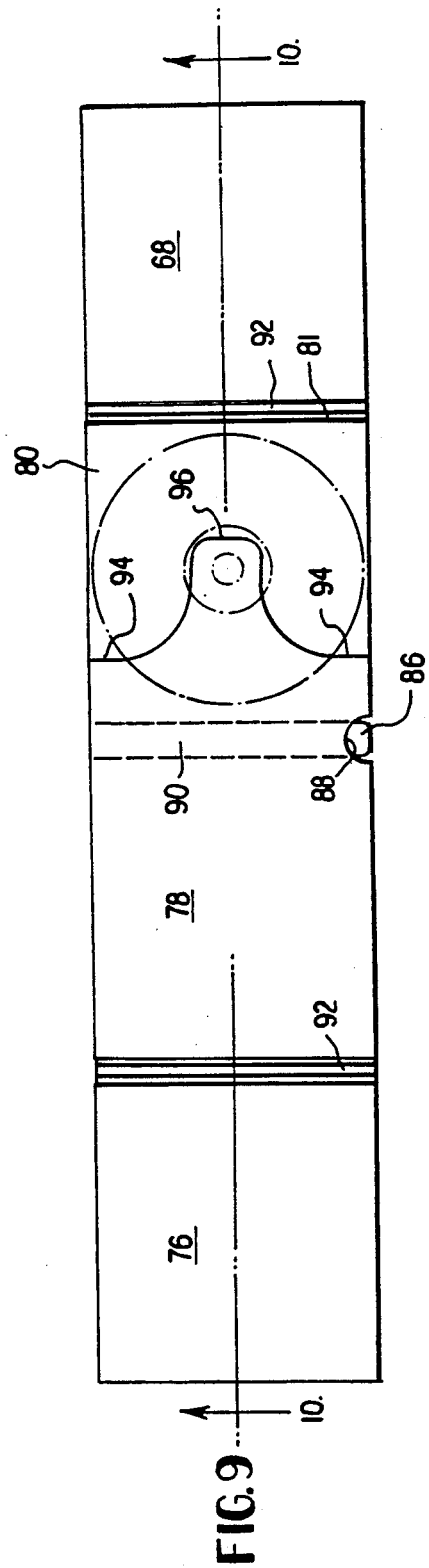
FIG. 9 is a view similar to FIG. 8 and illustrates the package after the top and middle panels have been folded over so as to overlie the panels 72 and 70 of the third row.

Panel 80 is provided with a serpentine, through cut line defined by cuts 94 and 96, with cuts 94 being substantially 90 degrees in angular extent and portion 96 being generally straight and vertical, these three cut portions joined by smooth arcs. As shown at FIG. 8, the top row of panels 62, 64 is folded down along upper fold lines 81 to overlie second row panels 78, 80. Flap 65 is sealed to panel 64 after folding of the latter onto panel 80. Upper lateral panel 76 is folded down upon and secured to lower lateral panel 74. The top row of panels of FIG. 8 is now folded about the lower lines 81 and sealed, to arrive at the configuration of FIG. 9. A CD 83 is placed into the serpentine slot as shown at FIG. 10, also indicated by the interrupted circle of FIG. 9. A pocket for CD 83 is defined by portions of panels 80 and panel 64, with flap 65 closing the right edge of the pocket. A separate booklet can be adhered to panel 78 or graphics printed thereon. Lower lateral panel 68 and panel pair 74, 76 are now folded over, as indicated by the curved arrows of FIG. 10. From this configuration, the steps of wrapping the container and disc, removal of tear strips 84 and 90, and folding the package are the same as shown at FIGS. 5 and 6. Tear strip 84 is approximately the same width as tear strip 90.

FIGS. 11 and 12 illustrate a modification similar to that of FIGS. 7 to 10. Except for the absence of panel 76 of FIG. 7, and the addition of left flap 65' on panel 78, the blank of FIG. 11 is substantially the same as the blank of FIG. 7. The other difference is the presence of serpentine slits 94, 96, 94 in panel 78 and an additional cut 98 in panel 80. Flap 65' forms the bottom of a left pocket and flap 65 (as before) forms the bottom of a right pocket. Arcuate cut 98 in panel 80 conforms to the curvature of a CD 83 which is placed in the right pocket, similar to that shown in FIG. 10. When placed in the right pocket, a part of the periphery of a compact disc engages the cut paperboard edge at 98 to assist in maintaining the disc in the pocket during shipping and handling of the package. A booklet may be placed in the left pocket. The folding sequence is similar to that previously described and requires panels 62 and 64 of FIG. 11 to fold about (upper) horizontal lines 81 down onto panels 78 and 80. Flaps 65 and 65' are then folded over panels 64 and 62, respectively. The resultant double layer laminate is now folded about the lower horizontal lines 81 and onto panels 70 and 72, as shown at FIG. 12. The panel pairs 62, 64 and 78, 80 and 70, 72 are secured together upon folding, as by adhesive, heat sealing, or other conventional techniques, as are the flaps 65, 65'. The embodiment of FIGS. 11 and 12 is folded, wrapped and used in the manner previously described. It will be apparent that the flap 65' of FIG. 11 may be used with the package of FIGS. 1 to 6 to form a pocket and closure in the same manner.

It will be apparent that serpentine cuts 94, 96, 94 may be straight as well as curved.

The terms vertical and horizontal have been employed to facilitate the description and are not intended as terms of limitation.

I claim:

1. A unitary paperboard blank construction for making a compact disc package, the blank including a first pair of generally rectangular panels foldably joined to each other in a lower, first row by a foldable joint, a second pair of generally rectangular panels in an upper, second row connected to each other by a first frangible connection, the panels in the second pair foldably joined to respective panels in the first row along common collinear edges of said first and second pair of panels, a third pair of generally rectangular panels in a third row, above said row, connected to each other by a second frangible connection, said third pair of panels foldably joined to said second pair of panels about a fold axis defined by two collinear edges of said second panel pair, said first and second frangible connections and said foldable joint being aligned, at least one panel of said pairs of panels having means to receive and position thereon a compact disc.

2. The unitary blank of claim 1 wherein said means is a circular cut-out.

3. The unitary blank of claim 1 wherein said means is a slit.

4. The unitary blank of claim 1 wherein said frangible connections are each defined by a tear strip.

5. The unitary blank of claim 1 wherein said foldable joint is defined by spaced parallel fold lines.

6. The unitary blank of claim 1 wherein said means is a pintle.

7. The unitary blank of claim 1 wherein the lower end of said second tear strip extends into a cut-out in the blank.

8. The unitary blank construction of claim 6 wherein said pintle is located on a panel of said first row of panels.

9. A unitary paperboard blank construction for making a compact disc package, the blank including a first pair of generally rectangular panels foldably joined to each other in a lower, first row by a foldable joint, a second pair of generally rectangular panels in an upper, second row connected to each other by a first frangible connection, the panels in the second pair foldably joined to respective panels in the first row along common collinear edges of said first and second pair of panels, said first and frangible connection and said foldable joint being aligned, at least one panel of said pairs of panels having means to receive and position thereon a compact disc, said first row of panels including a lateral panel at each end thereof, each said lateral panel foldably joined to a respective one of said panels in said first row, at least one said lateral panel foldably joined to an upper lateral panel, said upper lateral panel foldably joined to an end of one of said panels in said second row.

10. The unitary blank construction of claim 1 wherein said first row of panels includes a lateral panel at each end thereof, each said lateral panel foldably joined to a respective one of said panels in said first row at least one said lateral panel foldably joined to an upper lateral panel, said upper lateral panel foldably joined to an end of one of said panels in said second row.

11. A compact disc container formed from paperboard, the container including a lower, first pair generally rectangular panels connected together along corresponding edges thereof by a foldable joint, an upper second pair of generally rectangular panels connected together along corresponding edges thereof by a first frangible connection, the first and second panel pairs foldably joined together about a fold axis defined by two collinear edges of said first and second panel pairs, said panel pairs being overlapped, sad first frangible connection and said foldable joint overlying each other and aligned, whereby folding of the container about said foldable joint of said first pair of panels is resisted by said first frangible connection, and whereby said frangible connection can be manually destroyed by a user, including a third pair of generally rectangular panels connected together along corresponding edges thereof by a second frangible connection, the third pair panels foldably joined to said second panel pairs about a fold axis defined by two uppermost collinear panel edges of said second panel pairs, said second frangible joint aligned with said first frangible joint.

12. The container of claim 11 including means in one of the panels for receiving and positioning thereon a compact disc.

13. The container of claim 12 wherein said means includes a pintle.

14. The container of claim 11 wherein said means includes a circular opening.

15. The container of claim 12 wherein said means includes a slit.

16. The container of claim 12 wherein said means includes a serpentine slit.

17. The container of claim 11 wherein one of said panels of said second pair carries a foldable flap on an edge thereof opposite to said first frangible connection, said flap folded and secured to an adjacent panel of said third pair of panels to form a pocket.

18. The container of claim 17 wherein that panel which carries said flap is provided with a slit.

19. The container of claim 17 including a compact disc in said pocket.

20. The container of claim 13 including a compact disc mounted on said pintle.

* * * * *